US011433705B2

(12) United States Patent
Kunisawa et al.

(10) Patent No.: US 11,433,705 B2
(45) Date of Patent: Sep. 6, 2022

(54) STUDLESS TIRE

(71) Applicant: SUMITOMO RUBBER INDUSTRIES, LTD., Kobe (JP)

(72) Inventors: Tetsuya Kunisawa, Kobe (JP); Shuichiro Ono, Kobe (JP); Kenichi Uesaka, Kobe (JP); Seiji Hatano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 356 days.

(21) Appl. No.: 16/490,359

(22) PCT Filed: Feb. 27, 2018

(86) PCT No.: PCT/JP2018/007291
§ 371 (c)(1),
(2) Date: Aug. 30, 2019

(87) PCT Pub. No.: WO2018/159621
PCT Pub. Date: Sep. 7, 2018

(65) Prior Publication Data
US 2020/0009914 A1 Jan. 9, 2020

(30) Foreign Application Priority Data
Mar. 1, 2017 (JP) .............................. JP2017-038747

(51) Int. Cl.
B60C 1/00 (2006.01)
C08L 9/00 (2006.01)
C08L 7/00 (2006.01)
C08K 3/36 (2006.01)
C08F 36/06 (2006.01)
C08F 36/08 (2006.01)
C08F 8/04 (2006.01)

(52) U.S. Cl.
CPC ............ B60C 1/0016 (2013.01); C08F 36/06 (2013.01); C08F 36/08 (2013.01); C08K 3/36 (2013.01); C08L 7/00 (2013.01); C08L 9/00 (2013.01); C08F 8/04 (2013.01); C08L 2205/025 (2013.01)

(58) Field of Classification Search
CPC ..... C08L 9/00; C08L 7/00; C08K 3/36; B60C 1/00; C08F 36/06; C08F 36/08
USPC ....................................................... 523/157
See application file for complete search history.

(56) References Cited

U.S. PATENT DOCUMENTS

| 2010/0144954 | A1 | 6/2010 | Kikuchi et al. |
| 2011/0144236 | A1 | 6/2011 | Mihara |
| 2013/0109800 | A1 | 5/2013 | Weber |
| 2014/0155536 | A1 | 6/2014 | Kuwahara et al. |
| 2014/0213715 | A1 | 7/2014 | Kuwahara et al. |
| 2014/0296373 | A1* | 10/2014 | Mabuchi ................... C08L 9/00 523/156 |
| 2015/0051332 | A1 | 2/2015 | Koda et al. |
| 2015/0057403 | A1 | 2/2015 | Koda et al. |
| 2015/0065636 | A1 | 3/2015 | Kuwahara et al. |
| 2015/0191047 | A1* | 7/2015 | Kojima ..................... C08L 7/00 152/209.5 |
| 2015/0247027 | A1* | 9/2015 | Kojima ................... C08L 91/06 524/526 |
| 2016/0052340 | A1* | 2/2016 | Miyazaki .................. B60C 1/00 152/525 |
| 2016/0340500 | A1 | 11/2016 | Miyazaki et al. |
| 2016/0376453 | A1 | 12/2016 | Hearon |
| 2017/0313860 | A1 | 11/2017 | Takenaka et al. |
| 2019/0176520 | A1* | 6/2019 | Takenaka .................. C08L 7/00 |

FOREIGN PATENT DOCUMENTS

| CN | 103748158 A | 4/2014 |
| CN | 104245818 A | 12/2014 |
| CN | 104350075 A | 2/2015 |
| CN | 106009069 A | 10/2016 |
| CN | 106317520 A | 1/2017 |
| EP | 2 716 700 A1 | 4/2014 |
| EP | 2762525 A1 | 8/2014 |
| EP | 2818507 A1 | 12/2014 |
| EP | 2835386 A1 | 2/2015 |
| JP | 2006-89636 A | 4/2006 |
| JP | 2009-270044 A | 11/2009 |
| JP | 2010-138249 A | 6/2010 |
| JP | 2011-122062 A | 6/2011 |
| JP | 2016-216607 A | 12/2016 |
| RU | 2561179 C1 | 8/2015 |
| RU | 2570448 C2 | 12/2015 |
| RU | 2611511 C2 | 2/2017 |
| WO | WO 2012/160938 A1 | 11/2012 |
| WO | WO 2013/032468 A2 | 3/2013 |
| WO | WO 2013/047347 A1 | 4/2013 |
| WO | WO 2013/125496 A1 | 8/2013 |
| WO | WO 2013/151068 A1 | 10/2013 |

(Continued)

OTHER PUBLICATIONS

International Search Report, issued in PCT/JP2018/007291, dated Apr. 17, 2018.
Written Opinion of the International Searching Authority, issued in PCT/JP2018/007291, dated Apr. 17, 2018.
Chinese Office Action and Search Report for Chinese Application No. 201880015167.1, dated Jul. 1, 2021, with an English translation.

(Continued)

Primary Examiner — Deve V Hall
(74) Attorney, Agent, or Firm — Birch, Stewart, Kolasch & Birch, LLP

(57) ABSTRACT

A studless tire having a tread composed of a rubber composition for a tread comprising 1 to 20 parts by mass of a farnesene resin and 1 to 20 parts by mass of a terpene resin based on 100 parts by mass of a rubber component.

4 Claims, No Drawings

(56) References Cited

FOREIGN PATENT DOCUMENTS

| WO | WO-2015182778 A1 | * | 12/2015 | ............... | C08L 7/00 |
| WO | WO 2016/076424 A1 | | 5/2016 | | |
| WO | WO-2017195392 A1 | * | 11/2017 | ............... | C08K 3/36 |

OTHER PUBLICATIONS

Russian Office Action and Search Report for Russian Application No. 2019129081, dated Jul. 31, 2020, with English translation.
Extended European Search Report, dated Feb. 18, 2020, for European Application No. 18760462.4.

* cited by examiner

STUDLESS TIRE

TECHNICAL FIELD

The present invention relates to a studless tire.

BACKGROUND OF THE INVENTION

For running on ice and snow on a road, use of a spike tire and fitting of chains on tires have been employed so far, and in order to cope with an environmental problem such as a problem with a dust caused thereby, a studless tire for running on ice and snow on a road has been developed. As compared with a normal road surface, unevenness of a road surface of ice and snow is large, and various improvements have been made from material and design points of view.

A method of compounding a plurality of rubber components (polymer blend) has been employed as a method of improving various tire performances, for example, low temperature property, performance on snow and ice and abrasion resistance in good balance. Specifically, a mainstream of the method is to blend some polymer components represented by a styrene-butadiene rubber (SBR), a butadiene rubber (BR), and a natural rubber (NR) as rubber components for a tire. This is a means for making good use of characteristic of each polymer component and deriving physical properties of a rubber composition which cannot be derived only by a single polymer component.

In this polymer blend, a phase structure (morphology) of each rubber component after vulcanization and a degree of distribution (localization) of a filler into each rubber phase will be important factors for deciding physical properties. Elements for deciding control of morphology and localization of a filler are very complicated, and various studies have been made in order to exhibit physical properties of a tire in good balance, but there is a room for improvement in any of the studies.

For example, Patent Document 1 discloses a technology of specifying a particle size of an island phase and a silica distribution in an sea-island matrix of a rubber composition for a tire tread comprising a styrene-butadiene rubber. However, regarding a concrete method enabling the morphology thereof to be realized, there are described only use of a master batch comprising silica and adjustment of a kneading time and a rotation torque of a rotor, and in such a method, the morphology is affected greatly by kneading and vulcanizing conditions, and therefore, stable control of the morphology is difficult. Further, the rubber component disclosed in examples is a combination of styrene-butadiene rubbers having relatively similar polarities. Therefore, it is apparent that the disclosed technology cannot be applied to the blending of rubber components having greatly different polarities, namely greatly different affinities for silica such as blending of a butadiene rubber and a natural rubber.

Particularly in the case of control of dispersion of silica between the phases using a master batch comprising silica, even if a desired morphology and silica dispersion are achieved temporarily, in many cases, the morphology and the silica dispersion change with a lapse of time and therefore, it was difficult to form a morphology being stable with a lapse of time of more than several months.

PRIOR ART DOCUMENT

Patent Document

Patent Document 1: JP 2006-89636 A

SUMMARY OF THE INVENTION

Problem to be Solved by the Invention

An object of the present invention is to provide a studless tire being good in processability, braking performance on ice, morphology, silica dispersibility and stability over time of silica dispersion.

Means to Solve the Problem

The present invention relates to a studless tire having a tread composed of a rubber composition for a tread comprising 1 to 20 parts by mass of a farnesene resin and 1 to 20 parts by mass of a terpene resin based on 100 parts by mass of a rubber component.

It is preferable that the rubber composition for a tread further comprises 1 to 20 parts by mass of a cyclopentadiene resin.

It is preferable that the rubber component is a rubber component consists of an isoprene rubber and a butadiene rubber.

Effects of the Invention

The studless tire of the present invention is good in processability, braking performance on ice, morphology, silica dispersibility and stability over time of silica dispersion.

EMBODIMENT FOR CARRYING OUT THE INVENTION

The studless tire of the present invention is featured by having a tread composed of a rubber composition for a tread comprising predetermined amounts of a farnesene resin and a terpene resin.

Farnesene Resin

A farnesene resin stands for a polymer obtained by polymerization of farnesene as a monomer component. Examples of the farnesene include isomers such as α-farnesene ((3E,7E)-3,7,11-trimethyl-1,3,6,10-dodecatetraene) and β-farnesene (7,11-dimethyl-3-methylene-1,6,10-dodecatriene), and (E)-β-farnesene having the following structure is preferable.

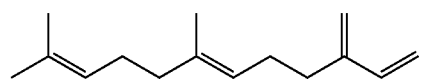

It is preferable to compound the farnesene resin in place of a softening agent such as oil which has been compounded so far. As a result, an effect of the present disclosure can be obtained more suitably.

The farnesene resin may be a homopolymer of farnesene (farnesene homopolymer) or may be a copolymer of farnesene and a vinyl monomer (farnesene-vinyl monomer copolymer). Examples of the vinyl monomer include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-tert-butyl-2-methylstyrene, vinyl ethyl benzene, divinylbenzene, trivinylbenzene, divinylnaphthalene, tert-butoxystyrene, vinylbenzyl dimethylamine, (4-vinylbenzyl)dimethylaminoethylether, N,N-dimethylaminoethyl styrene, N,N-dimethylaminomethyl styrene, 2-ethylstyrene, 3-ethylstyrene, 4-ethylstyrene, 2-tert-butylstyrene, 3-tert-butylstyrene, 4-tert-butylstyrene, vinylxylene, vinylnaphthalene, vinyltoluene, vinylpyridine, diphenylethylene and diphenylethylene having a tertiary amino group, conjugated diene compounds such as butadiene and isoprene and the like. Among these, styrene and butadiene are preferable. Namely, a copolymer of farnesene and styrene (a farnesene-styrene copolymer) and a copolymer of farnesene and butadiene (a farnesene-butadiene copolymer) are preferable as the farnesene-vinyl monomer copolymer. By compounding a farnesene-styrene copolymer, an effect of improving handling performance can be enhanced, and by compounding a farnesene-butadiene copolymer, an effect of improving performance on snow and ice and abrasion resistance can be enhanced.

A glass transition temperature (Tg) of the farnesene homopolymer is preferably not higher than −60° C., more preferably not higher than −70° C., and is preferably not lower than −120° C., more preferably not lower than −110° C. When the glass transition temperature is within the above-mentioned range, the farnesene homopolymer can be used as a softening agent for a tire. For the same reason as mentioned above, a glass transition temperature (Tg) of the farnesene-styrene copolymer is preferably not higher than −15° C., more preferably not higher than −30° C., and is preferably not lower than −80° C., more preferably not lower than −70° C. For the same reason as mentioned above, a glass transition temperature (Tg) of the farnesene-butadiene copolymer is preferably not higher than −60° C., more preferably not higher than −70° C., and is preferably not lower than −120° C., more preferably not lower than −110° C. The Tg is a value measured at a heat-up rate of 10° C./min in accordance with JIS-K7121: 1987 using a differential scanning calorimeter (Q200) available from TA Instruments, Japan.

A weight-average molecular weight (Mw) of the farnesene homopolymer is preferably not less than 3,000, more preferably not less than 5000, further preferably not less than 8,000. When the weight-average molecular weight is less than 3,000, handling performance and abrasion resistance tend to be deteriorated. On the other hand, the Mw of the farnesene homopolymer is preferably not more than 500,000, more preferably not more than 300,000, further preferably not more than 150,000. When the Mw exceeds 500,000, there is a tendency that grip performance on ice is deteriorated. For the same reason as mentioned above, the Mw of the farnesene-vinyl monomer copolymer is preferably not less than 3,000, more preferably not less than 5000, further preferably not less than 8,000, and is preferably not more than 500,000, more preferably not more than 300,000, further preferably not more than 150,000, particularly preferably not more than 100,000. The farnesene resin and farnesene-vinyl monomer copolymer having the Mw within the above-mentioned range is in a liquid form at normal temperature and can be suitably used as a softening agent for a tire.

A melt viscosity of the farnesene homopolymer is preferably not more than 1,000 Pa·s, more preferably not more than 200 Pa·s, and is preferably not less than 0.1 Pa·s, more preferably not less than 0.5 Pa·s. When the melt viscosity is within the above-mentioned range, the farnesene homopolymer can be suitably used as a softening agent for a tire, and is good in resistance to blooming. For the same reason as mentioned above, the melt viscosity of the farnesene-vinyl monomer copolymer is preferably not more than 1,000 Pa·s, more preferably not more than 650 Pa·s, further preferably not more than 200 Pa·s, and is preferably not less than 1 Pa·s, more preferably not less than 5 Pa·s. The melt viscosity is a value measured at 38° C. using a Brookfield type viscometer (manufactured by Brookfield Engineering Labs. Inc.).

In the farnesene homopolymer, a content of farnesene in 100% by mass of a monomer component is preferably not less than 80% by mass, more preferably not less than 90% by mass, and may be 100% by mass.

In the farnesene-vinyl monomer copolymer, a total content of farnesene and a vinyl monomer in 100% by mass of a monomer component is preferably not less than 80% by mass, more preferably not less than 90% by mass, and may be 100% by mass. Further, a copolymerization ratio of farnesene to a vinyl monomer on a mass basis is preferably farnesene:vinyl monomer=99:1 to 25:75, more preferably 80:20 to 40:60.

Synthesis of the farnesene resin can be made by a known method. For example, in the case of synthesis by anionic polymerization, a liquid farnesene resin can be obtained by charging hexane, farnesene, sec-butyl lithium and a vinyl monomer according to necessity into a pressure-resistant vessel having been subjected to sufficient replacement with nitrogen, then heating up the vessel and stirring the mixture for several hours, and subjecting an obtained polymerization liquid to quenching and vacuum drying.

In the polymerization for preparing the farnesene homopolymer, the polymerization procedure is not limited particularly, and for example, all the monomers may be subjected to polymerization at a time or polymerization may be conducted by adding the monomers in order. Also in the copolymerization for preparing the farnesene-vinyl monomer copolymer, the polymerization procedure is not limited particularly, and for example, all the monomers may be subjected to random copolymerization at a time, or after a specific monomer (for example, only a farnesene monomer or only a butadiene monomer) is copolymerized, remaining monomers may be added thereto for copolymerization, or each of specific monomers may be subjected to copolymerization previously and then block copolymerization.

Farnesene to be used for the farnesene resin may be one prepared from oil resources by chemical synthesis or may be one extracted from an insect such as an ant cow or a plant such as an apple. However, preferred is one prepared by culturing a microorganism using a source of carbon derived from *Saccharum*. A farnesene resin can be prepared efficiently by using the farnesene.

*Saccharum* may be any one of monosaccharide, disaccharide or polysaccharide, or may be a combination thereof. Examples of monosaccharide include glucose, galactose, mannose, fructose, ribose and the like. Examples of disaccharide include sucrose, lactose, maltose, trehalose, cellobiose and the like. Examples of polysaccharide include starch, glycogen, cellulose, chitin and the like.

A saccharide suitable for preparation of the farnesene can be obtained from various materials, and examples thereof include *Saccharum officinarum*, bagasse, *Miscanthus sinensis*, sugar beet, sorghum, grain sorghum, switchgrass, barley, hemp, *Hibiscus cannabinus*, potato, taro, cassava, sunflower, fruit, theriac, whey, skim milk, maize, straw, grains, flour, wood, paper, wheat straw, cotton and the like. Otherwise, waste cellulose, and other biomass materials may also be used. Among these, plants belonging to a *Saccharum* group such as *Saccharum officinarum* are preferable, and *Saccharum officinarum* is more preferable.

A microorganism is not limited particularly as far as it is one which can be cultured to prepare a farnesene. Examples thereof include eukaryotic, bacteria, archaebacterial and the like. Examples of eukaryotic include yeast, plants and the like.

Further, the microorganism may be a transformant. The transformant can be obtained by introducing a foreign gene into a microorganism becoming a host. The foreign gene is not limited particularly, and preferred is a foreign gene involved in production of farnesene for the reason that a production efficiency of farnesene can be improved more.

Culturing conditions are not limited particularly as far as they are conditions under which a microorganism can produce farnesene. A culture medium to be used for culturing a microorganism may be one which is usually used for culturing of a microorganism. Specific examples of a culture medium in a case of a bacteria include a KB culture medium, an LB culture medium and the like. In a case of yeast, examples of a culture medium therefor include a YM culture medium, a KY culture medium, an F101 culture medium, a YPD culture medium, a YPAD culture medium and the like. In a case of plants, examples of a culture medium therefor include basal mediums such as White culture medium, Heller culture medium, SH culture medium (Schenk-Hildebrandt culture medium), MS culture medium (Murashige-Skoog culture medium), LS culture medium (Linsmaier-Skoog culture medium), Gamborg culture medium, B5 culture medium, MB culture medium and WP culture medium (Woody Plant: for woody plants).

A culturing temperature varies with kind of a microorganism, and is preferably 0 to 50° C., more preferably 10 to 40° C., further preferably 20 to 35° C. A pH value is preferably 3 to 11, more preferably 4 to 10, further preferably 5 to 9. Further, the culturing can be carried out under an anaerobic condition and under an aerobic condition depending on kind of a microorganism.

The culturing of a microorganism can be conducted batchwise, or can be conducted continuously using a bioreactor. Examples of a specific culturing method include shake culture, rotation culture and the like. Farnesene can be accumulated in cells of a microorganism or can be generated and accumulated in a supernatant of culture.

In a case of obtaining farnesene from a microorganism after the culturing, the farnesene can be obtained by collecting microorganisms by centrifuging, subjecting the microorganisms to disruption and then extracting farnesene from a disrupted microorganism-containing liquid using a solvent such as 1-butanol. Further, a known refining method such as chromatography can also be combined with a solvent extraction method appropriately. Here, it is preferable that disruption of a microorganism is performed at a low temperature, for example, at 4° C. in order to prevent denaturation and degradation of farnesene. Microorganisms can be disrupted, for example, by physical disruption using glass beads.

Farnesene can be obtained from a supernatant of culture by removing bacterial cells by centrifugal separation and then extracting the farnesene using a solvent such as 1-butanol.

Farnesene resins obtained from the above-mentioned farnesene derived from microorganisms are available as commercially available ones, and examples of farnesene homopolymer include KB-101, KB-107 and the like manufactured by KURARAY CO., LTD., examples of farnesene-styrene copolymer include FSR-221, FSR-242, FSR-251, FSR-262 and the like manufactured by KURARAY CO., LTD., and examples of farnesene-butadiene copolymer include FBR-746, FB-823, FB-884 and the like manufactured by KURARAY CO., LTD.

A content of the farnesene resin is not less than 1 part by mass, preferably not less than 3 parts by mass, more preferably not less than 5 parts by mass based on 100 parts by mass of the rubber component. When the content of the farnesene resin is less than 1 part by mass, there is a tendency that an effect of improving performance on ice and snow and abrasion resistance and an effect of inhibiting a hardness change and coloring of a tire surface cannot be obtained sufficiently. The content of the farnesene resin is not more than 20 parts by mass, preferably not more than 15 parts by mass. When the content of the farnesene resin exceeds 50 parts by mass, handling performance and abrasion resistance tend to be deteriorated.

Terpene Resin

Examples of the terpene resin include a non-hydrogenated terpene resin such as a polyterpene resin comprising at least one selected from starting materials of terpene such as α-pinene, β-pinene, limonene and dipentene, an aromatic modified terpene resin prepared using a terpene compound and an aromatic compound as starting materials, and a terpene-phenol resin prepared using a terpene compound and a phenol compound as starting materials; and a hydrogenated compound thereof. Here, examples of the aromatic compound to be used as a starting material for the aromatic modified terpene resin include styrene, α-methylstyrene, vinyl toluene, divinyl toluene and the like. Further, examples of the phenol compound to be used as a starting material for the terpene-phenol resin include phenol, bisphenol A, cresol, xylenol and the like.

A softening point of the terpene resin is preferably not lower than 75° C., more preferably not lower than 80° C., further preferably not lower than 90° C. from the viewpoint of ease in handling. On the other hand, the softening point of the terpene resin is preferably not higher than 150° C., more preferably not higher than 140° C., further preferably not higher than 130° C. from the viewpoint of improvement of processability and dispersibility of the rubber component and the filler. In addition, in this invention, the softening point of the resin is determined by the following method. Namely, while heating 1 g of the resin as a sample at a temperature elevating rate of 6° C. per minute using Flowtester (CFT-500D manufactured by Shimadzu Corporation or the like), a load of 1.96 MPa is applied to the sample with a plunger, the sample is extruded through a nozzle having a diameter of 1 mm and a length of 1 mm, and a descending distance of the plunger of the Flowtester is plotted to a temperature. The softening point of the resin is a temperature when a half of the sample was flowed out.

A glass transition temperature (Tg) of the terpene resin is preferably not higher than 60° C., more preferably not higher than 50° C. for preventing the glass transition temperature of the rubber composition from becoming higher, thereby deteriorating durability. Further, a lower limit of the glass transition temperature of the terpene resin is not limited particularly, and is preferably not lower than 5° C., since a weight-average molecular weight (Mw) can be equal to or larger than that of oil and low volatility can be secured. A weight-average molecular weight (Mw) of the terpene resin is preferably not more than 300 since volatility at high temperature is good and the resin is allowed to disappear easily.

The SP value of the terpene resin is preferably not more than 8.60, more preferably not more than 8.50 since water repellency of the rubber composition can be enhanced more. A lower limit of the SP value of the terpene resin is preferably not less than 7.5 from the viewpoint of compatibility with the rubber component.

A content of the terpene resin is not less than 1 part by mass, more preferably not less than 5 parts by mass, further preferably not less than 8 parts by mass based on 100 parts by mass of the rubber component since an effect of the present invention is obtained satisfactorily. On the other hand, the content of the terpene resin is preferably not more than 20 parts by mass, more preferably not more than 15 parts by mass from a point that a hardness, mold-processability and a viscosity of the rubber composition can be properly secured.

Rubber Component

As the rubber components, those hitherto having been used in a rubber industry can be properly selected and used. For example, isoprene rubbers including a natural rubber and a polyisoprene rubber (IR), a butadiene rubber (BR), a styrene-butadiene rubber (SBR) and the like can be used. Among these, it is preferable to use isoprene rubbers and a butadiene rubber from the viewpoint of securing flexibility of a rubber during running on ice and snow.

The natural rubber includes a natural rubber (NR), a modified natural rubber such as an epoxidized natural rubber (ENR), a hydrogenated natural rubber (HNR), a deproteinized natural rubber (DPNR) or a high purity natural rubber (UPNR) and the like. Among these, a natural rubber (NR) is preferred from the viewpoint of mixing processability.

The NR is not limited particularly and those generally used in the tire industry such as SIR20, RSS #3 and TSR20 can be used.

A content of the natural rubber in the rubber component is preferably 20 to 60% by mass, more preferably 30 to 55% by mass from the viewpoint of processability and flexibility at low temperature.

Examples of the BR include an un-modified BR and modified BR. From the viewpoint of holding a viscosity during processing, it is preferable to use an un-modified BR, and from the viewpoint of filler distribution, it is preferable to use a modified BR.

Examples of the un-modified BR includes, but are not limited to, BR with a high cis content (high cis BR) such as BR1220 manufactured by Zeon Corporation and BR130B and BR150B manufactured by Ube Industries, Ltd.; and BR synthesized using a rare earth element catalyst (rare-earth-based BR), such as BUNA-CB25 manufactured by Lanxess K.K. These BRs may be used alone or in combination. Among them, high cis BR and rare-earth-based BR are preferable from the viewpoint of good abrasion resistance and breaking resistance.

The cis 1,4-bond content in the un-modified butadiene rubber is preferably 90% or more, more preferably 93% or more, further preferably 95% or more. When the cis 1,4-bond content is less than 90%, elongation at break and abrasion resistance tend to be inferior.

A Mooney viscosity ($ML_{1+4}(100°$ C.$)$) of the un-modified butadiene rubber is preferably 25 to 75, more preferably 40 to 60. When the Mooney viscosity ($ML_{1+4}$ ($100°$ C.$)$) is less than 25, physical properties of the rubber may be deteriorated. On the other hand, when the Mooney viscosity ($ML_{1+4}$ ($100°$ C.$)$) exceeds 75, workability may be inferior and kneading may be difficult. The Mooney viscosity ($ML_{1+4}(100°$ C.$)$) is a value obtained by a measuring method described later in Example.

When the rubber component comprises the un-modified butadiene rubber, a content thereof in the rubber component is preferably 10 to 70% by mass, more preferably 20 to 60% by mass. When the content of the un-modified butadiene rubber is less than 20% by mass, there is a tendency that an effect of compounding the un-modified butadiene rubber becomes insufficient. On the other hand, when the content of the un-modified butadiene rubber exceeds 60% by mass, it may be difficult to secure processability.

When the rubber component comprises the un-modified BR, a content thereof in the rubber component is preferably not less than 10% by mass, more preferably not less than 15% by mass, further preferably not less than 20% by mass, from the viewpoint of abrasion resistance, grip performance and fuel efficiency. On the other hand, the content of the un-modified BR is preferably not more than 70% by mass, more preferably not more than 60% by mass, from the viewpoint of abrasion resistance, grip performance and fuel efficiency.

The modified butadiene rubber is a butadiene rubber having an alkoxysilane condensate compound in an active terminal thereof, and is a rubber component having good reactivity with a silane coupling agent and silica. By combination use of this modified butadiene rubber with silica, a hydrophilic group on the silica surface is bonded to the modified butadiene rubber, thereby forming a filler gel to cover the hydrophilic group of the silica, and as a result, stability over time of silica dispersion can be improved.

The modified butadiene rubber is obtained by a process for preparation comprising a modification step (A) for performing a modification reaction by using a butadiene rubber having an active terminal to introduce an alkoxysilane compound having 2 or more reaction groups including an alkoxysilyl group into the active terminal of the butadiene rubber, and a condensation step (B) for condensation reaction of a residue of the alkoxysilane compound introduced into the active terminal in the presence of a condensation catalyst comprising at least one element selected from the group consisting of elements of group 4, group 12, group 13, group 14 and group 15 of the Periodic Table, wherein the butadiene rubber is one prepared by polymerization in the presence of a catalytic composition comprising, as a main component, a mixture of the following components (a) to (c).

Component (a): Lanthanoid-containing compound comprising at least one element selected from the group consisting of lanthanoid elements or a reaction product obtained by a reaction of the lanthanoid-containing compound and a Lewis base, Component (b): At least one compound selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$, Component (c): Iodine-containing compound having at least one iodine atom in a molecular structure thereof Namely, the modified butadiene rubber to be used in the present invention can be prepared by performing the modification reaction to introduce an alkoxysilane compound into the active terminal of the butadiene rubber and the condensation reaction of a residue of the alkoxysilane compound introduced into the active terminal in the presence of a condensation catalyst comprising at least one element among elements of group 4, group 12, group 13, group 14 and group 15 of the Periodic Table.

The modification step (A) is a step for performing a modification reaction by using a butadiene rubber having an active terminal to introduce an alkoxysilane compound having 2 or more reaction groups including an alkoxysilyl group into the active terminal of the butadiene rubber.

Modified butadiene rubber is preferably low cis modified butadiene rubbers prepared using a low cis butadiene rubber having a content of cis-1,4 bond of not more than 60% and/or a high cis butadiene rubber having a content of cis-1,4 bond of not less than 90%. In addition, herein the content of the cis-1,4 bond is a value calculated from signal strengths measured by NMR analysis.

When preparing the butadiene rubber as mentioned above, the polymerization may be conducted using a solvent or may be conducted without a solvent. Inactive organic solvents can be used as the solvent to be used for the polymerization (polymerization solvent), and examples thereof include saturated aliphatic hydrocarbons having 4 to 10 carbon atoms such as butane, pentane, hexane and heptane, saturated alicyclic hydrocarbons having 6 to 20 carbon atoms such as cyclopentane and cyclohexane, monoolefins such as 1-butene and 2-butene, aromatic hydrocarbons such as benzene, toluene and xylene, halogenated hydrocarbons such as methylene chloride, chloroform, carbon tetrachloride, trichloroethylene, perchloroethylene, 1,2-dichloroethane, chlorobenzene, bromobenzene and chlorotoluene, and the like.

When preparing the butadiene rubber as mentioned above, a polymerization reaction temperature is preferably from −30° C. to 200° C., more preferably from 0° C. to 150° C. A manner of the polymerization reaction is not limited particularly, and a batch type reactor may be used or the polymerization may be conducted continuously using equipment such as a multi-stage continuous reactor. In addition, when using a polymerization solvent, a monomer concentration in the solvent is preferably 5 to 50% by mass, more preferably 7 to 35% by mass. From the viewpoint of efficiency of the preparation of the butadiene rubber and from the viewpoint of not deactivating the butadiene rubber having an active terminal, it is preferable not to mix a compound having a deactivating effect such as oxygen, water or carbon dioxide gas in a polymerization system as much as possible.

Further in the present invention, a butadiene rubber obtained by polymerization in the presence of a catalytic composition comprising, as a main component, a mixture of the following Components (a) to (c) (hereinafter also referred to as "a catalyst") is used as a butadiene rubber to be used for preparing the modified butadiene rubber.

Component (a): Lanthanoid-containing compound comprising at least any one element selected from the group consisting of lanthanoids or a reaction product obtained by a reaction of the lanthanoid-containing compound and a Lewis base Component (b): At least one compound selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$ Component (c): Iodine-containing compound having at least one iodine atom in a molecular structure thereof By the use of such a catalyst, preparation of the butadiene rubber having a content of cis-1,4 bond of not less than 94.0% by mass becomes easy. Further, in the case of this catalyst, it is not necessary to carry out the polymerization reaction at a very low temperature and operation is easy. Therefore, this catalyst is useful in industrial production.

The Component (a) is a lanthanoid-containing compound comprising at least one element selected from the group consisting of lanthanoids or a reaction product obtained by a reaction of the lanthanoid-containing compound and a Lewis base. Among lanthanoids, neodymium, praseodymium, cerium, lanthanum, gadolinium and samarium are preferable. In the preparation process according to this invention, neodymium is particularly preferable among them. The above-mentioned lanthanoids may be used alone or may be used in combination of two or more thereof. Examples of the lanthanoid-containing compound include carboxylate, alkoxide, β-diketone complex, phosphate and phosphite of lanthanoid, and the like. Among them, carboxylate or phosphate is preferable, and carboxylate is more preferable.

Examples of the carboxylate of lanthanoid include salts of carboxylic acid represented by a general formula (2): $(R^4-COO)_3M$, wherein M represents lanthanoid, and $R^4$s are the same or different and represent hydrocarbon groups having 1 to 20 carbon atoms. In the general formula (2), $R^4$s are preferably saturated or unsaturated alkyl groups and are preferably linear, branched or cyclic alkyl groups. Further the carboxyl group is bonded to a primary, secondary or tertiary carbon atom. Specific examples thereof include salts of octanoic acid, 2-ethylhexanoic acid, oleic acid, stearic acid, benzoic acid, naphthenic acid, brand name "Versatic acid" (available from Shell Chemicals Japan Ltd., carboxylic acid having a carboxyl group bonded to a tertiary carbon atom), and the like. Among these, salts of Versatic acid, 2-ethylhexanoic acid and naphthenic acid are preferable.

Examples of the alkoxide of lanthanoid include those represented by a general formula (3): $(R^5O)_3M$, wherein M represents lanthanoid. Examples of the alkoxy group represented by "$R^5O$" in the general formula (3) include a 2-ethyl-hexylalkoxy group, an oleylalkoxy group, a stearylalkoxy group, a phenoxy group, a benzylalkoxy group, and the like. Among these, a 2-ethyl-hexylalkoxy group and a benzylalkoxy group are preferable.

Examples of the β-diketone complex of lanthanoid include an acetylacetone complex, a benzoylacetone complex, a propionitrileacetone complex, a valerylacetone complex, an ethylacetylacetone complex, and the like. Among these, an acetylacetone complex and an ethylacetylacetone complex are preferable.

Examples of the phosphate or phosphite of lanthanoid include bis(2-ethylhexyl)phosphate, bis(1-methylheptyl)phosphate, bis(p-nonylphenyl)phosphate, bis(polyethyleneglycol-p-nonylphenyl)phosphate, (1-methylheptyl) (2-ethylhexyl)phosphate, (2-ethylhexyl) (p-nonylphenyl) phosphate, mono-2-ethylhexyl(2-ethylhexyl)phosphonate, mono-p-nonylphenyl(2-ethylhexyl)phosphonate, bis(2-ethylhexyl)phosphite, bis(1-methylheptyl)phosphite, bis(p-nonylphenyl)phosphite, (1-methylheptyl) (2-ethylhexyl) phosphite, (2-ethylhexyl)(p-nonylphenyl)phosphite, and the like. Among these, bis(2-ethylhexyl)phosphate, bis(1-methylheptyl)phosphate, mono-2-ethylhexyl(2-ethylhexyl)phosphonate and bis(2-ethylhexyl)phosphite are preferable.

Among these, phosphate of neodymium or carboxylate of neodymium are particularly preferable as the lanthanoid-containing compound, and a neodymium salt of Versatic acid or neodymium 2-ethyl-hexanoate are most preferable.

In order to make the lanthanoid-containing compound soluble in a solvent or store the lanthanoid-containing compound stably for a long period of time, it is also preferable to mix the lanthanoid-containing compound with a Lewis base or react the lanthanoid-containing compound with a Lewis base to give a reaction product. An amount of the Lewis base is preferably 0 to 30 mol, more preferably 1 to 10 mol based on 1 mol of lanthanoid. Examples of the Lewis base include acetylacetone, tetrahydrofuran, pyridine, N,N- dimethylformamide, thiophene, diphenyl ether, triethylamine, an organophosphorus compound, monovalent or divalent alcohol, and the like. The above-mentioned Components (a) may be used alone or may be used in combination of two or more thereof.

The Component (b) is at least one compound selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$.

The aluminoxanes (hereinafter also referred to as "alumoxanes") are compounds having a structure represented by the following general formula (4) or (5). In addition, aluminoxanes may be aggregates of alumoxanes which are disclosed in Fine Chemical, 23, (9), 5 (1994), J. Am. Chem. Soc., 115, 4971 (1993), and J. Am. Chem. Soc., 117, 6465 (1995).

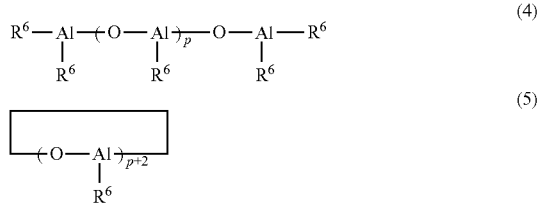

In the general formulae (4) and (5), $R^6$s are the same or different and each represents a hydrocarbon group having 1 to 20 carbon atoms. p is an integer of 2 or more. Examples of the $R^6$ include methyl, ethyl, propyl, butyl, isobutyl, tert-butyl, hexyl, isohexyl, octyl, isooctyl, and the like. Among these, methyl, ethyl, isobutyl and tert-butyl are preferable, and methyl is particularly preferable. In addition, the above-mentioned p is preferably an integer of 4 to 100.

Examples of the alumoxane include methyl alumoxane (hereinafter also referred to as "MAO"), ethyl alumoxane, n-propyl alumoxane, n-butyl alumoxane, isobutyl alumoxane, t-butyl alumoxane, hexyl alumoxane, iso-hexyl alumoxane, and the like. Among these, MAO is preferable. The above-mentioned alumoxanes can be prepared by a well-known method, and for example, can be prepared by adding trialkylaluminum or dialkylaluminum monochloride into an organic solvent such as benzene, toluene or xylene and further adding water, steam, steam-containing nitrogen gas or a salt containing crystallization water such as copper sulfate pentahydrate or aluminum sulfate.$16H_2O$, thereby allowing a mixture to be subjected to reaction. In addition, the above-mentioned alumoxanes may be used alone or may be used in combination of two or more thereof.

Examples of the organoaluminum compound represented by the general formula (1) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, isobutylaluminum dihydride, and the like. Among these, diisobutylaluminum hydride, triethylaluminum, triisobutylaluminum and diethylaluminum hydride are preferable, and diisobutylaluminum hydride is particularly preferable. The above-mentioned organoaluminum compounds may be used alone or may be used in combination of two or more thereof.

The Component (c) is an iodine-containing compound having at least one iodine atom in a molecular structure thereof. When using such an iodine-containing compound, a butadiene rubber having a content of cis-1,4 bonds of not less than 94.0% by mass can be prepared easily. The above-mentioned iodine-containing compound is not limited particularly as far as at least one iodine atom is contained in the molecular structure thereof. Examples thereof include iodine, trimethylsilyl iodide, diethylaluminum iodide, methyl iodide, butyl iodide, hexyl iodide, octyl iodide, iodoform, diiodomethane, benzylidene iodide, beryllium iodide, magnesium iodide, calcium iodide, barium iodide, zinc iodide, cadmium iodide, mercury iodide, manganese iodide, rhenium iodide, copper iodide, silver iodide, gold iodide, and the like.

Among these, preferred as the above-mentioned iodine-containing compound is a silicon iodide compound represented by a general formula (6): $R^7qSiI_{4-q}$, wherein $R^7$s are the same or different and each represents a hydrocarbon group having 1 to 20 carbon atoms or hydrogen atoms and q is an integer of 0 to 3, an iodinated hydrocarbon compound represented by a general formula (7): $R^8{}_rI_{4-r}$, wherein $R^8$s are the same or different and each represents a hydrocarbon group having 1 to 20 carbon atoms and r is an integer of to 3, or iodine. Such silicon iodide compound, iodinated hydrocarbon compound and iodine have good solubility in an organic solvent, thereby making operation simple, and therefore, are useful for industrial production. Namely, it is also one of the suitable embodiments of the present invention that the above-mentioned Component (c) is at least one iodine-containing compound selected from the group consisting of silicon iodide compounds, iodinated hydrocarbon compounds and iodine.

Examples of the silicon iodide compounds (compounds represented by the general formula (6)) include trimethylsilyl iodide, triethylsilyl iodide, dimethylsilyl diiodo, and the like. Among these, trimethylsilyl iodide is preferable. Examples of the iodinated hydrocarbon compounds (compounds represented by the general formula (7)) include methyl iodide, butyl iodide, hexyl iodide, octyl iodide, iodoform, diiodomethane, benzylidene iodide, and the like. Among these, methyl iodide, iodoform and diiodomethane are preferable.

Among these, particularly preferred as the iodine-containing compound are iodine, trimethylsilyl iodide, triethylsilyl iodide, dimethylsilyl diiodo, methyl iodide, iodoform and diiodomethane, and trimethylsilyl iodide is most preferable. The above-mentioned iodine-containing compounds may be used alone or may be used in combination of two or more thereof.

A compounding amount of each component (Components (a) to (c)) may be appropriately set according to necessity. The compounding amount of Component (a) is preferably from 0.00001 to 1.0 mmol, more preferably from 0.0001 to 0.5 mmol to 100 g of the conjugated diene compound. When the amount is less than 0.00001 mmol, the polymerization activity may decrease. When Component (a) is used in an amount of more than 1.0 mmol, a concentration of the catalyst becomes high and there is a case where a demineralizing process is required.

When Component (b) is alumoxane, a compounding amount of the alumoxane can be represented by a molar ratio of Component (a) to aluminum (Al) contained in the alumoxane, and "Component (a)": "aluminum (Al) contained in alumoxane" (molar ratio) is preferably 1:1 to 1:500, more preferably 1:3 to 1:250, further preferably 1:5 to 1:200. When the compounding amount of the alumoxane is out of the range mentioned above, activity of the catalyst decreases, or there is a case where a step for removing a residue of the catalyst is required.

When Component (b) is an organoaluminum compound, a compounding amount of the organoaluminum compound can be represented by a molar ratio of Component (a) to the organoaluminum compound, and "Component (a)": "organoaluminum compound" (molar ratio) is preferably 1:1 to 1:700, more preferably 1:3 to 1:500. When the compounding amount of the organoaluminum compound is out of the range mentioned above, activity of the catalyst decreases, or there is a case where a step for removing a residue of the catalyst is required.

A compounding amount of Component (c) can be represented by a molar ratio of iodine atoms contained in Component (c) to Component (a), and (iodine atoms contained in Component (c))/(Component (a)) (molar ratio) is preferably 0.5 to 3.0, more preferably 1.0 to 2.5, further preferably 1.2 to 2.0. When the molar ratio of (iodine atoms contained in Component (c))/(Component (a)) is less than 0.5, the activity of the polymerization catalyst may decrease. When the molar ratio of (iodine atoms contained in Component (c))/(Component (a)) is more than 3.0, Component (c) may be catalytic poison.

In the above-mentioned catalyst, in addition to Components (a) to (c), at least one compound selected from the group consisting of conjugated diene compounds and non-conjugated diene compounds is added in an amount of preferably not more than 1000 mol, more preferably from 3 to 1000 mol, further preferably from 5 to 300 mol to one mol of Component (a). Addition of at least one compound selected from the group consisting of conjugated diene compounds and non-conjugated diene compounds to the catalyst is preferred since activity of the catalyst is enhanced more. In that case, examples of the conjugated diene compound to be used include 1,3-butadiene, isoprene, and the like similarly to the monomer for the polymerization explained later. Examples of the non-conjugated diene compounds include divinylbenzene, diisopropenylbenzene, triisopropenylbenzene, 1,4-vinylhexadiene, ethylidenenorbornene, and the like.

The catalytic composition comprising a mixture of Components (a) to (c) as a main component can be prepared by reacting Components (a) to (c) dissolved in a solvent and further at least one compound selected from the group consisting of conjugated diene compounds and non-conjugated diene compounds and added according to necessity. When preparing the catalytic composition, an order of addition of each component may be decided optionally. Meanwhile, it should be noted that from the viewpoint of enhancement of polymerization activity and shortening of an induction period of time for polymerization initiation, preferably each component is previously mixed, reacted and further aged. An aging temperature is preferably from 0° C. to 100° C., more preferably from 20° C. to 80° C. When the aging temperature is lower than 0° C., the aging tends to be insufficient. On the other hand, when the aging temperature exceeds 100° C., there is a tendency that the activity of the catalyst decreases and widening of a molecular weight distribution is easily generated. An aging time is not limited particularly. Further, before addition into a polymerization reactor, each component may be brought into contact with each other in a supply line, and in that case, 0.5 minute or more suffices as an aging time. In addition, the prepared catalyst will be stable for several days.

With respect to the butadiene rubber to be used for preparing the modified butadiene rubber to be used in the present invention, a ratio of a weight-average molecular weight (Mw) to a number-average molecular weight (Mn) measured by a gel permeation chromatography (GPC), namely a molecular weight distribution (Mw/Mn) is preferably 3.5 or less, more preferably 3.0 or less, further preferably 2.5 or less. When the molecular weight distribution is more than 3.5, physical properties of a rubber such as breaking resistance and low heat build-up property tend to be deteriorated. On the other hand, a lower limit of the molecular weight distribution is not limited particularly. In addition, herein the molecular weight distribution (Mw/Mn) means a value calculated from a ratio of a weight-average molecular weight to a number-average molecular weight (a weight-average molecular weight/a number-average molecular weight). Here, the weight-average molecular weight of the butadiene rubber is a weight-average molecular weight obtained by measuring with a GPC method and calculating in terms of standard polystyrene. Further, the number-average molecular weight of the butadiene rubber is a number-average molecular weight obtained by measuring with a GPC method and calculating in terms of standard polystyrene.

In addition, the vinyl content and the cis-1,4 bond content of the butadiene rubber can be easily adjusted by controlling a polymerization temperature. Further, the above-mentioned Mw/Mn can be easily adjusted by controlling a molar ratio between the above-mentioned Components (a) to (c).

Further, a Mooney viscosity at 100° C. ($ML_{1+4}$(100° C.)) of the butadiene rubber is within a range of preferably from 5 to 50, more preferably from 10 to 40. When the Mooney viscosity is less than 5, there is a case where mechanical property, abrasion resistance and the like after vulcanization are deteriorated. On the other hand, when the Mooney viscosity exceeds 50, there is a case where processability at the time of kneading of the modified butadiene rubber after the modification reaction is deteriorated. The Mooney viscosity can be adjusted easily by controlling the molar ratio between the Components (a) to (c). In addition, the Mooney viscosity ($ML_{1+4}$(100° C.)) is a value obtained by the measuring method described in Example explained later.

The content of 1,2-vinyl bond of the above-mentioned butadiene rubber is preferably not more than 0.5% by mass, more preferably not more than 0.4% by mass, further preferably not more than 0.3% by mass. When the content exceeds 0.5% by mass, physical properties of a rubber such as breaking resistance tend to be deteriorated. Further, the content of 1,2-vinyl bond of the above-mentioned butadiene rubber is preferably not less than 0.001% by mass, more preferably not less than 0.01% by mass. In addition, herein the content of 1,2-vinyl bond is a value calculated from signal strengths measured by an NMR analysis.

The alkoxysilane compound to be used for the above-mentioned modification step (A) (hereinafter also referred to as "a modifying agent") is one having two or more reaction groups including an alkoxysilyl group. The reaction groups other than the alkoxysilyl group are not limited particularly, and for example, at least one functional group selected from the group consisting of (f): an epoxy group, (g): an isocyanate group, (h): a carbonyl group and (i): a cyano group is preferable. Namely, the above-mentioned alkoxysilane compound having at least one functional group selected from the group consisting of (f): an epoxy group, (g): an isocyanate group, (h): a carbonyl group and (i): a cyano group is also one of the suitable embodiments. In addition, the above-mentioned alkoxysilane compound may be a partially condensation product or may be a mixture of the alkoxysilane compound and the partially condensation product.

Here, "partially condensation product" means a compound in which a part (namely, not all) of the SiOR (OR represents an alkoxy group) is formed into an SiOSi bond by the condensation. In addition, preferred as the butadiene rubber to be used for the above-mentioned modification reaction is one in which at least 10% of polymer chains have a living property.

Examples of the suitable alkoxysilane compound having (f): an epoxy group (hereinafter also referred to as "epoxy group-containing alkoxysilane compound") include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane. Among these, 3-glycidoxypropyltrimethoxysilane and 2-(3,4-epoxycyclohexyl)ethyltrimethoxysilane are preferable.

Further, examples of the alkoxysilane compound having (g): an isocyanate group (hereinafter also referred to as "isocyanate group-containing alkoxysilane compound") include 3-isocyanatopropyltrimethoxysilane, 3-isocyanatopropyltriethoxysilane, 3-isocyanatopropylmethyldiethoxysilane, 3-isocyanatopropyltriisopropoxysilane, and the like, and among these, 3-isocyanatopropyltrimethoxysilane is particularly preferable.

Also, examples of the alkoxysilane compound having (h): a carbonyl group (hereinafter also referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane and the like, and among these, 3-methacryloyloxypropyltrimethoxysilane is particularly preferable.

Further, examples of the alkoxysilane compound having (i): a cyano group (hereinafter also referred to as "cyano group-containing alkoxysilane compound") include 3-cyanopropyltriethoxysilane, 3-cyanopropyltrimethoxysilane, 3-cyanopropylmethyldiethoxysilane, 3-cyanopropyltriisopropoxysilane, and the like, and among these, 3-cyanopropyltrimethoxysilane is particularly preferable.

Among these, particularly preferred as the modifying agent are 3-glycidoxypropyltrimethoxysilane, 2-(3,4-epoxycyclohexyl)ethyltrimethoxysilane, 3-isocyanatopropyltrimethoxysilane, 3-methacryloyloxypropyltrimethoxysilane and 3-cyanopropyltrimethoxysilane, and 3-glycidoxypropyltrimethoxysilane is most preferable. These modifying agents may be used alone or may be used in combination of two or more thereof. Further, a partially condensation product of the above-mentioned alkoxysilane compounds can also be used.

An amount of the above-mentioned alkoxysilane compound to be used in the modification reaction of the modification step (A) is preferably 0.01 to 200 mol, more preferably 0.1 to 150 mol to one mol of the above-mentioned Component (a). When the amount is less than 0.01 mol, the modification reaction does not advance sufficiently, and dispersibility of a filler is not improved fully. Therefore, sufficient mechanical property, abrasion resistance and low heat build-up property may not be obtained after the vulcanization. On the other hand, even in the case of use of the alkoxysilane compound in an amount exceeding 200 mol, there is a case where the modification reaction has been saturated, and in that case, it will cost excessively. In addition, while a method of adding the above-mentioned modifying agent is not limited particularly, there are a method of adding batchwise, a method of adding dividedly, a method of adding continuously and the like, and among these, the method of adding batchwise is preferable.

It is preferable to carry out the modification reaction in a solution, and the solution which was used for the polymerization and contains an unreacted monomer can be used as it is. A manner of the modification reaction is not limited particularly, and a batch type reactor may be used or the reaction may be conducted continuously using equipment such as a multi-stage continuous reactor or an in-line mixer. Further, it is preferable to conduct this modification reaction after completion of the polymerization reaction, but before performing desolvation treatment, water treatment, and heat treatment, various operations necessary for isolation of the polymer.

A temperature of the modification reaction can be the same as the polymerization temperature for the polymerization of the butadiene rubber. Specifically, the temperature is preferably 20° C. to 100° C., more preferably 30° C. to 90° C. When the temperature is lower than 20° C., a viscosity of the polymer tends to increase, and when the temperature exceeds 100° C., an active terminal of the polymer may be deactivated.

Further, a reaction time in the modification reaction is preferably from five minutes to five hours, more preferably from 15 minutes to one hour. In addition, in the condensation step (B), a conventional antioxidant and a conventional reaction terminator, as desired, may be added after introducing a residue of the alkoxysilane compound into the active terminal of the polymer.

In the modification step (A), in addition to the above-mentioned modifying agent, it is preferable to add a compound which is consumed by a condensation reaction with the alkoxysilane compound residue being a modifying agent introduced into the active terminal, in the condensation step (B). Specifically, it is preferable to add a functional group-introducing agent. This functional group-introducing agent can enhance abrasion resistance of the modified butadiene rubber.

The functional group-introducing agent is not limited particularly as far as it does not cause a direct reaction with the active terminal substantially and remains in the reaction system as an unreacted product. For example, preferred is an alkoxysilane compound different from the alkoxysilane compound to be used as the above-mentioned modifying agent, namely an alkoxysilane compound having at least one functional group selected from the groups consisting of (j): an amino group, (k): an imino group and (l): a mercapto group. In addition, the alkoxysilane compound to be used as the functional group-introducing agent may be a partially condensation product or may be a mixture of an alkoxysilane compound to be used as the functional group-introducing agent, which is not a partially condensation product, and the above-mentioned partially condensation product.

Examples of the functional group-introducing agent include, as the alkoxysilane compound having (j): an amino group (hereinafter also referred to as "amino group-containing alkoxysilane compound"), 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino)propyltriethoxysilane, 3-(1-pyrrolidinyl) propyl(triethoxy)silane, 3-(1-pyrrolidinyl) propyl(trimethoxy)silane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propan amine, N-(1-methylpropylidene)-3-(triethoxysilyl)-1-propanamine, N-(4-N, N-dimethylaminobenzylidene)-3-(triethoxysilyl)-1-propanamine, N-(cyclohexylidene)-3-(triethoxysilyl)-1-propanamine, and trimethoxysilyl compounds, methyldiethoxysilyl compounds, ethyldiethoxysilyl compounds, methyldimethoxysilyl compounds or ethyldimethoxysilyl compounds corresponding to the above-mentioned triethoxysilyl compounds, and among these, 3-diethylaminopropyl(triethoxy)silane, 3-dimethylaminopropyl(triethoxy)silane, 3-aminopropyltriethoxysilane, N-(1-methylpropylidene)-3-(triethoxysilyl)-1-propanamine and N-(1,3-dimethylbutylidene)-3-(triethoxysilyl)-1-propanamine are particularly preferable.

Further, examples of the suitable alkoxysilane compound having (k): an imino group (hereinafter also referred to as "imino group-containing alkoxysilane compound") include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, N-(3-isopropoxysilylpropyl)-4,5-dihydroimidazole and N-(3-methyldiethoxysilylpropyl)-4,5-dihydroimidazole, and among these, 3-(1-hexamethyleneimino)propyl(triethoxy)silane, 3-(1-hexamethyleneimino)propyl(triethoxy)silane, (1-hexamethyleneimino)methyl(trimethoxy)silane, 1-(triethoxysilyl)propyl]-4,5-dihydroimidazole, 1-[3-(trimethoxysilyl)propyl]-4,5-dihydroimidazole and N-(3-triethoxysilylpropyl)-4,5-dihydroimidazole are more preferable.

Further, examples of the alkoxysilane compound having (l): a mercapto group (hereinafter also referred to as "mercapto group-containing alkoxysilane compound") include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane and the like, and among these, 3-mercaptopropyltriethoxysilane is particularly preferable.

Among these, particularly preferred as the functional group-introducing agent are 3-diethylaminopropyl(triethoxy)silane, 3-dimethylaminopropyl(triethoxy)silane, 3-aminopropyltriethoxysilane, 3-(1-hexamethyleneimino)propyl(triethoxy)silane, N-(1-methylpropylidene)-3-(triethoxysilyl)-1-propanamine, N-(1,3-dimethylbutylidene)-3-(triethoxysilyl)-1-propanamine, 3-(1-hexamethyleneimino)propyl(triethoxy)silane, (1-hexamethyleneimino)methyl(trimethoxy)silane, 1-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole and 3-mercaptopropyltriethoxysilane, and 3-aminopropyltriethoxysilane is most preferable. These functional group introducing agents may be used alone or may be used in combination of two or more thereof.

When the alkoxysilane compound is used as the functional group-introducing agent, its amount is preferably 0.01 to 200 mol, more preferably 0.1 to 150 mol to one mol of the above-mentioned Component (a). When the amount is less than 0.01 mol, the condensation reaction does not advance sufficiently, and dispersibility of a filler is not improved fully. Therefore, there is a case where mechanical property, abrasion resistance and low heat build-up property after the vulcanization may be inferior. On the other hand, even in the case of use of the alkoxysilane compound in an amount exceeding 200 mol, there is a case where the condensation reaction is saturated, and in that case, it will cost excessively.

A timing of addition of the functional group-introducing agent is preferably after the introduction of the residue of the alkoxysilane compound into the active terminal of the butadiene rubber in the modification step (A) and before the initiation of the condensation reaction of the condensation step (B). When the functional group-introducing agent is added after the initiation of the condensation reaction, there is a case where the functional group-introducing agent is not dispersed uniformly and catalytic performance is deteriorated. Specifically, the timing of addition of the functional group-introducing agent is preferably from five minutes to five hours after the initiation of the modification reaction, more preferably from 15 minutes to one hour after the initiation of the modification reaction.

In addition, when the alkoxysilane compound having the above-mentioned functional group is used as the functional group-introducing agent, the modification reaction occurs between the butadiene rubber having an active terminal and the substantially stoichiometric amount of modifying agent added to the reaction system, and alkoxysilyl groups are introduced into substantially all of the active terminals. Further the addition of the above-mentioned functional group-introducing agent results in the introduction of the residues of the alkoxysilane compound more than the equivalent of the active terminals of the butadiene rubber.

From the viewpoint of a reaction efficiency, it is preferable that the condensation reaction between the alkoxysilyl groups occurs between the free alkoxysilane compound and the alkoxysilyl group at the terminal of the butadiene rubber and in some cases, between the alkoxysilyl groups at the terminals of the butadiene rubber, and the reaction between the free alkoxysilane compounds is not preferable. Therefore, when an alkoxysilane compound is added anew as the functional group-introducing agent, it is preferable that hydrolyzability of the alkoxysilyl group thereof is lower than the hydrolyzability of the alkoxysilyl group introduced into the terminal of the butadiene rubber.

For example, preferred is a combination such that a compound having a trimethoxysilyl group having high hydrolyzability is used as the alkoxysilane compound to be used for the reaction with the active terminal of the butadiene rubber, and a compound having an alkoxysilyl group (e.g. a triethoxysilyl group) having hydrolyzability lower than that of the trimethoxysilyl group-containing compound is used as the alkoxysilane compound to be newly added as the functional group-introducing agent. On the contrary, for example, when the triethoxysilyl group-containing compound is used as the alkoxysilane compound for the reaction with the active terminal of the butadiene rubber, and the alkoxysilane compound to be newly added as the functional group-introducing agent is a trimethoxysilyl group-containing compound, reaction efficiency may be deteriorated.

The condensation step (B) is a step for condensation reaction of a residue of the alkoxysilane compound introduced into the active terminal in the presence of a condensation catalyst comprising at least one element selected from the group consisting of elements of group 4, group 12, group 13, group 14 and group 15 of the Periodic Table.

The condensation catalyst is not limited particularly as far as it comprises at least one element selected from the group consisting of elements of group 4, group 12, group 13, group 14 and group 15 of the Periodic Table. It is preferable that the condensation catalyst comprises at least one element selected from the group consisting of titanium (Ti) (group 4), tin (Sn) (group 14), zirconium (Zr) (group 4), bismuth (Bi) (group 15) and aluminum (Al) (group 13).

Examples of the condensation catalyst comprising tin (Sn) include tin bis(n-octanoate), tin bis(2-ethylhexanoate), tin bis(laurate), tin bis(naphthoate), tin bis(stearate), tin bis(oleate), dibutyltin diacetate, dibutyltin di-n-octanoate, dibutyltin di-2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate), di-n-octyltin bis(2-ethylhexylmaleate), and the like.

Examples of the condensation catalyst comprising zirconium (Zr) include tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyloxide)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), zirconium bis(2-ethylhexanoate) oxide, zirconium bis(laurate) oxide, zirconium bis(naphthenate) oxide, zirconium bis(stearate) oxide, zirconium bis(oleate) oxide, zirconium bis(linoleate) oxide, zirconium tetrakis(2-ethylhexanoate), zirconium tetrakis(laurate), zirconium tetrakis(naphthenate), zirconium tetrakis(stearate), zirconium tetrakis(oleatoe, zirconium tetrakis(linoleate), and the like.

Examples of the condensation catalyst comprising bismuth (Bi) include bismuth tris(2-ethylhexanoate), bismuth tris(laurate), bismuth tris(naphthenate), bismuth tris(stearate), bismuth tris(oleate), and bismuth tris(linoleate).

Examples of the condensation catalyst comprising aluminum (Al) include triethoxyaluminum, tri-n-propoxyaluminum, tri-i-propoxyaluminum, tri-n-butoxyaluminum, tri-sec-butoxyaluminum, tri-Cert-butoxyaluminum, tri(2-ethylhexyloxide)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris(ethylacetoacetate), aluminum tris(2-ethylhexanoate), aluminum tris(laurate), aluminum tris(naphthenate), aluminum tris(stearate), aluminum tris(oleate), aluminum tris(linoleate), and the like.

Examples of the condensation catalyst comprising titanium (Ti) include tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, titanium tetra(2-ethylhexyloxide), titanium bis(octandioleate)bis(2-ethylhexyloxide), titanium tetra(octanedioleate), titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatebis(ethylacetoacetate), titanium tributoxyacetylacetonate, titanium dibutoxybis(acetylacetonate), titanium tributoxyethylacetoacetate, titanium dibutoxyacetylacetonatebis(ethylacetoacetate), titanium tetrakis(acetylacetonate), titanium diacetylacetonatebis(ethylacetoacetate), titanium oxide bis(2-ethylhexanoate), titanium oxide bis(laurate), titanium oxide bis(naphthenate), titanium oxide bis(stearate), titanium oxide bis(oleate), titanium oxide bis(linoleate), titanium tetrakis(2-ethylhexanoate), titanium tetrakis(laurate), titanium tetrakis(naphthenate), titanium tetrakis(stearate), titanium tetrakis(oleate), titanium tetrakis (linoleate), and the like.

Among these, the condensation catalysts comprising titanium (Ti) are more preferable as the above-mentioned condensation catalyst. Among the condensation catalysts comprising titanium (Ti), alkoxides, carboxylates or acetylacetonate complex salts of titanium (Ti) are further preferable. Particularly preferred is tetra-i-propoxytitanium (tetraisopropyltitanate). By the use of the condensation catalyst comprising titanium (Ti), the condensation reaction of the residue of the alkoxysilane compound to be used as the modifying agent and the residue of the alkoxysilane compound to be used as the functional group-introducing agent can be accelerated more effectively, which makes it possible to obtain the modified butadiene rubber having good processability, low temperature property and abrasion resistance. Thus, the above-mentioned condensation catalyst comprising titanium (Ti) is also one of the suitable embodiments.

With respect to an amount of the condensation catalyst, the number of moles of the various compounds which can be used as the condensation catalysts is preferably from 0.1 to 10 mol, particularly preferably from 0.3 to 5 mol to one mol of the total amount of alkoxysilyl groups being present in the reaction system. When the number of moles is less than 0.1 mol, the condensation reaction may not advance sufficiently. On the other hand, even when more than 10 mol of the condensation catalyst is used, there is a case where the effect of the condensation catalyst is saturated, and in that case, it will cost excessively.

While the condensation catalyst can be added before the above-mentioned modification reaction, it is preferable to add it after the modification reaction and before the initiation of the condensation reaction. When the condensation catalyst is added before the modification reaction, a direct reaction with the active terminal occurs and there is a case where an alkoxysilyl group cannot be introduced into the active terminal. Further, when the condensation catalyst is added after the initiation of the condensation reaction, there is a case where the condensation catalyst is not dispersed uniformly and catalyst performance is deteriorated. Specifically, a timing of addition of the condensation catalyst is preferably from five minutes to five hours after the initiation of the modification reaction, more preferably from 15 minutes to one hour after the initiation of the modification reaction.

It is preferable to conduct the condensation reaction of the condensation step (B) in an aqueous solution, and a condensation reaction temperature is preferably from 85° C. to 180° C., more preferably from 100° C. to 170° C., particularly preferably from 110° C. to 150° C. When the condensation reaction temperature is lower than 85° C., there is a case where the condensation reaction is not advanced sufficiently and cannot be completed. In that case, a change over time occurs on the obtained modified butadiene rubber, which may be a problem with quality. On the other hand, when the condensation reaction temperature exceeds 180° C., aging reaction of the polymer advances, which may deteriorate physical properties of the polymer.

A pH value of the aqueous solution in which the condensation reaction is conducted is preferably from 9 to 14, more preferably from 10 to 12. When the pH value of the aqueous solution is within such a range, the condensation reaction is accelerated, and stability over time of the modified butadiene rubber can be improved. When the pH value is less than 9, there is a case where the condensation reaction is not advanced sufficiently and cannot be completed. In that case, a change over time occurs on the obtained modified butadiene rubber, which may be a problem with quality. On the other hand, when the pH value of the aqueous solution in which the condensation reaction is conducted exceeds 14, a large amount of a component derived from alkali remains in the modified butadiene rubber after isolation thereof, and removal of such a component may be difficult.

A reaction time of the condensation reaction is preferably from five minutes to ten hours, more preferably from about 15 minutes to about five hours. When the reaction time is less than five minutes, the condensation reaction may not be completed. On the other hand, even when the reaction time exceeds ten hours, the condensation reaction might have been saturated. Further, a pressure inside a reaction system during the condensation reaction is preferably from 0.01 to 20 MPa, more preferably from 0.05 to 10 MPa.

A manner of the condensation reaction is not limited particularly, and a batch type reactor may be used or condensation reaction may be conducted continuously using equipment such as a multi-stage continuous reactor. Further, desolvation may be performed at the same time as the condensation reaction.

As mentioned above, the targeted modified butadiene rubber can be obtained by conducting well-known post-treatment after the condensation reaction.

A Mooney viscosity ($ML_{1+4}(125°$ C.)) of the modified butadiene rubber is preferably from 10 to 150, more preferably from 20 to 100. When the Mooney viscosity ($ML_{1+4}(125°$ C.)) is less than 10, physical properties of a rubber such as breaking resistance may be deteriorated. On the other hand, when the Mooney viscosity ($ML_{1+4}(125°$ C.)) exceeds 150, workability may be deteriorated and kneading with the compounding agents may be difficult. In addition, the Mooney viscosity ($ML_{1+4}(125°$ C.)) is a value obtained by the measuring method described in Example explained later.

A molecular weight distribution (Mw/Mn) of the modified butadiene rubber is preferably 3.5 or less, more preferably 3.0 or less, further preferably 2.5 or less. When the molecular weight distribution is more than 3.5, physical properties of a rubber such as breaking resistance and low heat build-up property tend to be deteriorated. Here, the weight-average molecular weight (Mw) of the modified butadiene rubber is a weight-average molecular weight measured with a GPC method and calculated in terms of polystyrene. Further, the number-average molecular weight (Mn) of the modified butadiene rubber is a number-average molecular weight obtained by measuring with a GPC method and calculating in terms of polystyrene.

Further, a cold flow (mg/min) of the modified butadiene rubber is preferably not more than 1.0, more preferably not more than 0.8. When the cold flow exceeds 1.0, form stability of the polymer during the storage may be deteriorated. In addition, herein the cold flow (mg/min) is a value calculated by a measuring method explained later.

Further, an evaluation value of the stability over time of the modified butadiene rubber is preferably from 0 to 5, more preferably from 0 to 2. When the evaluation value exceeds 5, a change over time of the polymer may occur during the storage. In addition, herein the stability over time is a value calculated by a measuring method explained later.

Further, a glass transition temperature of the above-mentioned modified butadiene rubber is preferably not higher than −40° C., more preferably not higher than −43° C., further preferably not higher than −46° C., particularly preferably not higher than −50° C. When the glass transition temperature exceeds −40° C., low temperature property required for a studless tire may not be secured sufficiently. On the other hand, a lower limit of the glass transition temperature is not limited particularly. Here, the glass transition temperature of the modified butadiene rubber can be measured by a measuring method described in Example explained later.

When the rubber component comprises the modified butadiene rubber, a content thereof is preferably not less than 40% by mass, more preferably not less than 45% by mass from the viewpoint of breaking performance on ice. On the other hand, the content is preferably not more than 80% by mass, more preferably not more than 75% by mass from the viewpoint of processability and breaking performance on ice.

In addition to the above-mentioned components, the rubber composition for a tread can comprise compounding agents generally used in manufacturing rubber composition such as a filler, a silane coupling agent, a resin other than a farnesene resin and a terpene resin, oil, wax, antioxidants, stearic acid, zinc oxide, a vulcanizing agent and a vulcanization accelerator.

Examples of the filler include silica, carbon black, aluminum hydroxide, calcium carbonate, hard clay crown and the like.

The silica is not limited particularly, and usual ones in tire industries, for example, silica (silicic acid anhydride) prepared by a dry method, silica (hydrous silicic acid) prepared by a wet method, and the like can be used.

A nitrogen adsorption specific surface area ($N_2SA$) of silica is preferably not less than 80 $m^2/g$, more preferably not less than 100 $m^2/g$. When the $N_2SA$ of silica is less than 80 $m^2/g$, there is a tendency that enough reinforcing property cannot be obtained, and it is difficult to secure breaking resistance and abrasion resistance required for a tread. The $N_2SA$ of silica is preferably not more than 200 $m^2/g$, more preferably not more than 180 $m^2/g$. When the $N_2SA$ of silica exceeds 200 $m^2/g$, there is a tendency that it is difficult to secure low temperature property. Herein, the $N_2SA$ of silica is a value measured by a BET method in accordance with ASTM D3037-81.

When the rubber composition comprises the silica, a content thereof is preferably not less than 5 parts by mass, more preferably not less than 10 parts by mass, further preferably not less than 20 parts by mass based on 100 parts by mass of the rubber component, from the viewpoint of durability and elongation at break. On the other hand, the content is preferably not more than 100 parts by mass, more preferably not more than 90 parts by mass, further preferably not more than 80 parts by mass from the viewpoint of improvement of dispersibility at kneading and from the viewpoint of inhibiting processability from lowering due to re-agglomeration of the silica arising during heating at rolling and during storage after the rolling.

Examples of the carbon black include furnace black, acetylene black, thermal black, channel black, graphite, and the like, and these carbon blacks may be used alone or may be used in combination of two or more thereof. Among these, furnace black is preferable since low temperature property and abrasion resistance can be improved in good balance.

A nitrogen adsorption specific surface area ($N_2SA$) of the carbon black is preferably not less than 15 $m^2/g$, more preferably not less than 30 $m^2/g$ from the viewpoint that sufficient reinforcing property and abrasion resistance can be obtained. Further, the $N_2SA$ of the carbon black is preferably not more than 200 $m^2/g$, more preferably not more than 150 $m^2/g$ from a point that dispersibility thereof is good and heat generation hardly arises. The $N_2SA$ can be measured according to JIS K 6217-2 "Carbon black for rubber industry—Fundamental characteristics—Part 2: Determination of specific surface area—Nitrogen adsorption methods—Single-point procedures".

When the rubber composition comprises the carbon black, a content thereof is preferably not less than 5 parts by mass, more preferably not less than 10 parts by mass based on 100 parts by mass of the total rubber components. When the content of carbon black is less than 5 parts by mass, sufficient reinforcing property tends not to be obtained. Further, the content of carbon black is preferably not more than 60 parts by mass, more preferably not more than 50 parts by mass, further preferably not more than 40 parts by mass. When the content of carbon black exceeds 60 parts by mass, there is a tendency that processability becomes inferior, low temperature property is lowered, and abrasion resistance is lowered.

The silane coupling agent is not limited particularly, and examples thereof include sulfide-based silane coupling agents such as bis(3-triethoxysilylpropyl) tetrasulfide, bis(2-triethoxysilylethyl)tetrasulfide, bis(3-trimethoxysilylpropyl) tetrasulfide, bis(2-trimethoxysilylethyl)tetrasulfide, bis(3-triethoxysilylpropyl)trisulfide, bis(3-trimethoxysilylpropyl) trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto-based silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-based 1 silane coupling agents such as vinyltriethoxysilane and vinyltrimethoxysilane; amino-based silane coupling agents such as 3-aminopropyltriethoxysilane, 3-aminopropyltrimethoxysilane, 3-(2-aminoethyl) aminopropyltriethoxysilane, and 3-(2-aminoethyl) aminopropyltrimethoxysilane; glycidoxy-based silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents such as 3-nitropropyltrimethoxysilane and 3-nitropropyltriethoxysilane; chloro-based silane coupling agents such as 3-chloropropyltrimethoxysilane, 3-chloropropyltriethoxysilane, 2-chloroethyltrimethoxysilane and 2-chloroethyltriethoxysilane; and the like. These silane coupling agents may be used alone or may be used in combination of two or more thereof. Among these, from the view point of good reactivity with silica, sulfide silane coupling agents are preferred, and bis(3-triethoxysilylpropyl)disulfide is particularly preferred.

When the rubber composition comprises the silane coupling agent, a content thereof is preferably not less than 3 parts by mass, more preferably not less than 5 parts by mass based on 100 parts by mass of silica. When the content of silane coupling agent is less than 3 parts by mass, breaking strength tends to be lowered. The content of silane coupling agent based on 100 parts by mass of silica is preferably not more than 20 parts by mass, more preferably not more than 15 parts by mass. When the content of silane coupling agent exceeds 20 parts by mass, an effect offsetting increase in cost tends not to be obtained.

Examples of the resin other than the farnesene resin and the terpene resin include adhesive resins such as a cyclopentadiene resin, a coumarone resin, petroleum resins (an aliphatic petroleum resin, an aromatic petroleum resin, an alicyclic petroleum resin and the like), a phenolic resin and a rosin resin. Among these, a cyclopentadiene resin having a lower SP value as compared with other adhesive resins and being good in compatibility with the NR is preferred.

Examples of the cyclopentadiene resins include dicyclopentadiene resins, cyclopentadiene resins, methylcyclopentadiene resins (un-hydrogenated cyclopentadiene resins), and these cyclopentadiene resins subjected to hydrogenation (hydrogenated cyclopentadiene resins).

Among the cyclopentadiene resins, hydrogenated dicyclopentadiene resins are preferred. The hydrogenation of the cyclopentadiene resins can be performed by a well-known method, and in this invention, commercially available hydrogenated cyclopentadiene resins can also be used.

A softening point of the cyclopentadiene resin is preferably not lower than 80° C., more preferably not lower than 90° C., further preferably not lower than 100° C. from the viewpoint of ease in handling. On the other hand, the softening point of the cyclopentadiene resin is preferably not higher than 160° C., more preferably not higher than 150° C., further preferably not higher than 140° C. from the viewpoint of improvement of processability and dispersibility of the rubber component and the filler. In addition, in this invention, the softening point of the resin is determined by the following method. Namely, while heating 1 g of the resin as a sample at a temperature elevating rate of 6° C. per minute using Flowtester (CFT-500D manufactured by Shimadzu Corporation or the like), a load of 1.96 MPa is applied to the sample with a plunger, the sample is extruded through a nozzle having a diameter of 1 mm and a length of 1 mm, and a descending distance of the plunger of the Flowtester is plotted to a temperature. The softening point of the resin is a temperature when a half of the sample was flowed out.

A glass transition temperature (Tg) of the cyclopentadiene resin is preferably not higher than 90° C., more preferably not higher than 80° C. for preventing the glass transition temperature of the rubber composition from becoming higher and durability from deteriorating. Further, a lower limit of the glass transition temperature of the cyclopentadiene resin is not limited particularly, and is preferably not lower than 30° C., since a weight-average molecular weight (Mw) can be equal to or larger than that of oil and low volatility can be secured. A weight-average molecular weight of the cyclopentadiene resin is preferably not more than 1,000 since volatility at high temperature is good and the resin is allowed to disappear easily.

It is noted that the SP value of the cyclopentadiene resin is preferably not more than 8.5, more preferably not more than 8.4 for the reason that water repellency of the rubber composition can be enhanced more. In addition, a lower limit of the SP value of the cyclopentadiene resin is preferably not less than 7.9 from the viewpoint of compatibility with the rubber component.

A content of the cyclopentadiene resin is preferably not less than 1 part by mass, more preferably not less than 3 parts by mass, further preferably not less than 5 parts by mass based on 100 parts by mass of the rubber component since an effect of the present invention is obtained satisfactorily. On the other hand, the content of the cyclopentadiene resin is preferably not more than 20 parts by mass, more preferably not more than 15 parts by mass from a point that a hardness, mold-processability and a viscosity of the rubber composition can be properly secured.

Oil is not limited particularly, and for example, process oil, vegetable fats and oils or a mixture thereof can be used. Examples of usable process oil include paraffin process oil, aromatic process oil, naphthenic process oil and the like. Among these, mineral oil is preferable from a point that tire performance at low temperature is good. These oils may be used alone or may be used in combination of two or more thereof.

When the rubber composition comprises the oil, a content thereof is preferably not less than 12 parts by mass, more preferably not less than 20 parts by mass based on 100 parts by mass of the whole rubber component. When the content of the oil is less than 12 parts by mass, there is a tendency that low temperature property such as a property of keeping a hardness of a rubber low at a low temperature becomes worse. On the other hand, the content of the oil is preferably not more than 60 parts by mass, more preferably not more than 55 parts by mass. When the content of the oil exceeds 60 parts by mass, there is a tendency that a tensile strength and a low heat build-up property are lowered and processability is lowered.

Wax is not limited particularly, and paraffin wax such as Ozoace 0355 available from NIPPON SEIRO CO., LTD., OK5258H available from PARAMELT or the like is preferable.

When the rubber composition comprises the paraffin wax, a content thereof is preferably not less than 1.0 part by mass, more preferably not less than 1.2 parts by mass based on 100 parts by mass of the rubber component. On the other hand, the content of the paraffin wax is preferably not more than 2.0 parts by mass, more preferably not more than 1.8 parts by mass.

The antioxidants such as amine, phenol and imidazole compounds and carbamic acid metal salt can be optionally selected and blended to the rubber composition. These antioxidants may be used alone or may be used in combination of two or more thereof. Among these, from a point that ozone resistance can be improved significantly and breaking resistance is good, amine-based antioxidants are preferred, and more preferred is N-(1,3-dimethylbutyl)-N'-phenyl-p-phenylenediamine.

When the rubber composition comprises the antioxidant, a content thereof is preferably not less than 0.5 part by mass, more preferably not less than 1.0 part by mass, further preferably not less than 1.5 parts by mass based on 100 parts by mass of the whole rubber component. When the content of the antioxidant is less than 0.5 part by mass, there is a tendency that sufficient ozone resistance cannot be obtained and breaking resistance is hardly improved. On the other hand, the content of the antioxidant is preferably not more than 6 parts by mass, more preferably not more than 5 parts by mass, further preferably not more than 4 parts by mass. When the content of the antioxidant exceeds 6 parts by mass, coloring tends to be generated.

Any of wax, stearic acid and zinc oxide which have been used commonly in a rubber industry can be used.

The vulcanizing agent is not limited particularly, and those which have been used in a rubber industry can be selected appropriately and used. Examples thereof include sulfur such as powdered sulfur, precipitated sulfur, colloidal sulfur, surface-treated sulfur and insoluble sulfur.

The vulcanization accelerator is also not limited particularly, and those which have been used commonly in a rubber industry can be used.

The rubber composition for a tread according to this invention can be prepared by a well-known method. For example, the rubber composition can be prepared by a method of kneading each of the above-mentioned components using a kneading apparatus such as an open roll, a Banbury mixer or a closed kneader, and then conducting vulcanization, or the like method.

Here, the kneading step for kneading each component may be a kneading step comprising a base kneading step for kneading compounding agents and additives other than the vulcanizing agent and vulcanization accelerators with a kneading apparatus such as a Banbury mixer, a kneader or an open roll and a final kneading step (F-kneading) for adding the vulcanizing agent and vulcanization accelerators to a kneaded product obtained in the base kneading step. Further, from the viewpoint of dispersing the silica more efficiently, it is preferable to divide the base kneading step into an X-kneading step for preparing a masterbatch comprising a butadiene rubber, silica and an isoprene rubber which is a minimum requirement for securing processability and a Y-kneading step for adding remaining compounding agents and additives other than the vulcanizing agent and vulcanization accelerators to the masterbatch and then kneading a resultant kneaded product.

The studless tire according to this invention can be produced by a usual method using the above-mentioned rubber composition for a tread. Namely, the unvulcanized rubber composition is extrusion-processed into a shape of a tread of a tire, and the obtained extruded product is laminated with other tire members to form an unvulcanized tire on a tire molding machine. The tire of the present invention can be produced by heating and pressurizing this unvulcanized tire in a vulcanizer.

EXAMPLE

The present invention will be described based on Examples, but the present invention is not limited thereto only.

A variety of chemicals used in Examples and Comparative Examples will be explained below.
NR: TSR20
Un-modified BR: BR730 (Un-modified BR, cis content: 95%, $ML_{1+4}$(100° C.): 55) manufactured by JSR Corporation
Modified BR: Terminal-modified BR (Cis content: 40%, trans content: 50%, vinyl content: 10%, Mw: 600,000)
Carbon black: DIABLACK I (ASTM No. N220, $N_2SA$: 114 $m^2/g$, DBP: 114 ml/100 g) available from Mitsubishi Chemical Corporation
Silica: ULTRASIL VN3 ($N_2SA$: 175 $m^2/g$, average primary particle size: 15 nm) manufactured by Evonik Degussa GmbH Silane coupling agent: Si75 (bis(3-triethoxysilylpropyl)disulfide) manufactured by Evonik Degussa GmbH
Cyclopentadiene resin: Oppera PR-120 (hydrogenated cyclopentadiene resin) manufactured by Exxon Mobil Corporation
Farnesene resin: Farnesene-butadiene copolymer prepared by synthesis of a farnesene resin described below
Terpene resin: PX1150N (polyterpene resin not hydrogenated, SP value: 8.26, softening point: 115° C., Tg: 62° C.) manufactured by Yasuhara Chemical Co., Ltd.
Oil: Process X-140 (aromatic oil) manufactured by JX Nippon Oil & Energy Corporation
Wax: OK5258H (available from PARAMELT, paraffin wax comprising 95% by mass or more of paraffin wax having 20 to 50 carbon atoms)
Antioxidant 1: NOCRAC 6C (N-(1,3-dimethylbutyl)-N-phenyl-p-phenylenediamine, 6PPD) available from Ouchi Shinko Chemical Industrial Co., Ltd.
Antioxidant 2: NOCRAC RD (poly(2,2,4-trimethyl-1,2-dihydroquinoline) available from Ouchi Shinko Chemical Industrial Co., Ltd.
Processing aid: Aflux16 (a mixture of calcium salt of fatty acid and amide ester) available from Rhein Chemie Corporation
Stearic acid: Stearic acid "Tsubaki" available from NOF CORPORATION
Zinc oxide: Zinc Oxide No. 1 manufactured by Mitsui Mining & Smelting Co., Ltd.
Sulfur: 5% oil-treated powdered sulfur (soluble sulfur having an oil content of 5% by mass) available from Tsurumi Chemical Industry Co., Ltd.
Vulcanization accelerator 1: Nocceler CZ (CBS, N-cyclohexyl-2-benzothiazolylsulfeneamide) manufactured by OUCHI SHINKO CHEMICAL INDUSTRIAL CO., LTD.
Vulcanization accelerator 2: Nocceler M-P (MBT, 2-mercaptobenzothiazole) manufactured by OUCHI SHINKO CHEMICAL INDUSTRIAL CO., LTD.
Vulcanization accelerator 3: Nocceler D (DPG, 1,3-diphenylguanidine) manufactured by OUCHI SHINKO CHEMICAL INDUSTRIAL CO., LTD.
Synthesis of Farnesene Resin
Chemicals used for synthesis of a farnesene resin are described below.
Cyclohexane: Cyclohexane (special grade) available from Kanto Chemical Industry Co., Ltd.
Isopropanol: Isopropanol (special grade) available from Kanto Chemical Industry Co., Ltd.
TMEDA: Tetramethylethylenediamine (reagent) available from Kanto Chemical Industry Co., Ltd.
Butadiene: 1,3-butadiene available from TAKACHIHO CHEMICAL INDUSTRIAL CO., LTD.
Isoprene: Isoprene (reagent) available from Wako Pure Chemical Industries, Ltd.
Farnesene: (E)-β-farnesene (reagent) available from Nippon Terpene Chemicals, Inc.
<Preparation of Catalyst Solution>
(1) After replacing inside of a 50 ml glass container with nitrogen gas, 8 ml of cyclohexane solution of butadiene (2.0 mol/L), 1 ml of neodymium(III) 2-ethylhexanoate/cyclohexane solution (0.2 mol/L) and 8 ml of PMAO (Al: 6.8% by mass) were poured into the container, followed by stirring of a mixture. Five minutes after, 5 ml of 1M hydrogenated diisobutyl aluminum/hexane solution was added to the mixture, and further five minutes after, 2 ml of 1M diethyl aluminum chloride/hexane solution was added to the mixture, followed by stirring to obtain a catalyst solution (1).

(2) A catalyst solution (2) was obtained in the same manner as in (1) above except that butadiene was replaced with isoprene.
<Synthesis of Farnesene Resin>
After replacing inside of a 3 L pressure-resistant stainless steel container with nitrogen gas, 1,800 ml of cyclohexane, 60 g of farnesene and 40 g of butadiene were poured into the container, followed by 10-minute stirring. Thereafter, 2 ml of the catalyst solution (1) was added to a mixture, followed by stirring while keeping a temperature at 30° C. Three hours after, 10 ml of 0.01 M BHT (butylated hydroxytoluene)/isopropanol solution was added dropwise to terminate a reaction. After having been cooled, a reaction liquid was added to 3 L of methanol prepared separately and a thus-obtained precipitate was air-dried overnight and further was subjected to 2-day drying under reduced pressure to obtain 100 g of farnesene resin (farnesene/butadiene copolymer). A degree of polymerization (percentage of "dry weight/charged amount") was substantially 100%.
<Measurements of Farnesene Resin>
With respect to the farnesene resin obtained above, a weight-average molecular weight Mw, a number-average molecular weight Mn, a glass transition temperature Tg, a Mooney viscosity and a copolymerization ratio (1) of a branched conjugated diene compound (1) were measured according to the following methods.
(Measurements of Weight-Average Molecular Weight Mw and Number-Average Molecular Weight Mn)
The Mw and Mn were calibrated with standard polystyrene based on measurement values determined with equipment of GPC-8000 series manufactured by Tosoh Corporation; detector: differential refractometer
(Measurement of Glass Transition Temperature (Tg))
The Tg of each copolymer was measured using a differential scanning calorimeter (DSC) while heating up from an initial temperature of −150° C. up to a final temperature of 150° C. at a temperature elevating rate of 10° C./min.
(Measurement of Mooney Viscosity of Copolymer)
A Mooney viscometer was used and an L-rotor was rotated under the temperature condition of 130° C. by 1-minute preheating, and after a lapse of four minutes, a Mooney viscosity $ML_{1+4}$(130° C.) of each copolymer was determined according to JIS K 6300 "Test Method of Unvulcanized rubber". The smaller the Mooney viscosity is, the better the processability is.
(Copolymerization Ratio of Farnesene)
A copolymerization ratio (weight %) was measured by a usual method with pyrolysis gas chromatography (PGC). Namely, a calibration curve of a refined farnesene was made, and a weight % of farnesene in the copolymer was calculated from an area ratio of a pyrolysis product derived from farnesene, in which the area ratio was obtained by PGC. A system comprising a gas chromatograph-gas spectrometer GCMS-QP5050A manufactured by Shimadzu Corporation and a pyrolyzer JHP-330 manufactured by Japan Analytical Industry Co., Ltd. was used for the pyrolysis chromatography.

EXAMPLES AND COMPARATIVE EXAMPLES

Chemicals other than sulfur and vulcanization accelerators were subjected to kneading in accordance with compounding formulations shown in Table 1 at a discharge temperature of 150° C. for five minutes using a 1.7 L closed Banbury mixer to obtain a kneaded product. Subsequently sulfur and vulcanization accelerators were added to the obtained kneaded product, followed by 4-minute kneading with a biaxial open roll until the temperature became 105° C., to obtain an unvulcanized rubber composition. The obtained unvulcanized rubber composition was subjected to vulcanization and molding at 170° C. for 12 minutes at a pressure of 25 kgf/cm² to produce test rubber compositions.

The unvulcanized rubber composition was extruded and molded into a shape of a tire tread by an extruder equipped with a base having a predetermined shape, and then laminated with other tire members to form an unvulcanized tire, which was then press-vulcanized at 170° C. for 12 minutes to manufacture a tire for test (size: 195/65R15, studless tire).

The obtained unvulcanized rubber compositions, vulcanized rubber compositions and test tires were subjected to the following evaluations. The evaluation results are shown in Table 1.

Braking Performance On-Ice

The test tires were mounted on a 2000 cc domestic FR car. In-vehicle running on ice surface was carried out under the following conditions, and braking performance on ice was evaluated. In the evaluation of braking performance on ice, the car was run on an ice surface and a lock brake was applied at a speed of 30 km/hr. A stopping distance required for stopping the car after putting on the lock brake (stopping distance on ice, stopping distance on snow) was measured, and was indicated by an index calculated by the following equation. The larger the index is, the better the performance on ice and snow (grip performance on ice and snow) is. It can be said that the performance on ice and snow has been improved when the index exceeds 100.

(Index of braking performance on-ice)=(Stopping distance of Comparative Example 1)/(Stopping distance of each formulation)×100

On-ice test site: Hokkaido Nayoro test course, temperature: −1 to −6° C.

Evaluation of Morphology

A vulcanized rubber composition was subjected to surface shaping and observed with a scanning electron microscope (SEM). The morphology of each phase could be confirmed by comparison of a contrast. As a result, in Examples and Comparative Examples, it was confirmed that a contrast of Examples is lower than that of Comparative Examples. The morphology in each of Examples and Comparative Examples is indicated by an index, assuming that the morphology in Comparative Example 1 is 100. It shows that the larger the index is, the lower the contrast is, and the dispersibility of silica is good.

Dispersibility of Silica

Ultra thin slices were prepared from a test rubber composition using a microtome and were observed using a transmission electron microscope. Morphology of each phase could be confirmed by comparison of each contrast. As a result, it was confirmed that in Examples and Comparative Examples, the two BR and NR phases were incompatible with each other.

Silica can be observed in the form of particulate. An area of silica per unit area of each phase was measured in ten regions of one sample, and an average value was determined. An amount of the silica of a phase comprising the BR was determined from the average value, and an abundance ratio of silica of the following equation 1 was calculated using a compounding amount (part by mass) of silica based on 100 parts by mass of the whole rubber components.

An index of silica dispersion was indicated by the following equation 2, assuming that an abundance ratio of silica in Comparative Example 1 is 100. It shows that as the index is larger, a larger amount of silica is dispersed in the BR phase.

(Abundance ratio of silica)=(Amount of silica in a phase comprising BR)/(Compounding amount of silica(part by mass))×100    (Equation 1)

(Index of silica dispersion)=(Abundance ratio of silica)/(Abundance ratio of silica in Comparative Example 1)×100    (Equation 2)

Stability Over Time of Silica Dispersion

For the same vulcanized rubber composition, an abundance ratio α of silica in the BR phase after a lapse of one year from completion of vulcanization was measured in the same manner as described above. Then, a change rate of an abundance ratio α of silica after a lapse of one year from completion of vulcanization was calculated by the following equation based on an abundance ratio α of silica in the BR phase after a lapse of 200 hours from completion of vulcanization. Stability over time of silica dispersion is indicated by an index, assuming that a change rate of Comparative Example 1 is 100. The larger the index is, the smaller the change rate of the abundance ratio α is, and the stability over time is good.

Change rate (%)=|α(one year after)−α(200 hours after)|/α(200 hours after)×100

Wet Grip Performance

The tires for test were loaded on the whole wheels of a car (2000 cc FF car domestically produced), and on the wet asphalt road surface, a braking distance from an initial speed of 100 km/h was measured. The results are shown by an index. The larger the index is, the better the wet grip performance is. The index was obtained by the following equation.

(Index of wet grip performance)=(Braking distance of Comparative Example 1)/(Braking distance of each formulation)×100

Sticking of Snow

The test tires were mounted on a test car (2000 cc domestic FR car), and in-vehicle running on snow surface was carried out. After the running, clogging of snow and sticking of snow on the lateral grooves of the test tires were observed with naked eyes, and indicated by an index, assuming that the result of Comparative Example 1 was 100. The larger the index is, the higher the effect of inhibiting clogging of snow and sticking of snow is. The test was performed at the test course of Sumitomo Rubber Industries, Ltd. in Nayoro, Hokkaido, and air temperature on snow was −2° C.−−10° C.

Aging of Hardness

Aging of hardness is shown by a value obtained by measuring a Mooney viscosity ($ML_{1+4}$(125° C.)) after keeping the test rubber composition for two days in a thermostatic bath at 90° C. and calculating from the following formula. Aging of hardness is indicated by an index, assuming that the aging of hardness in Comparative Example 1 is 100. It shows that the larger the index is, the smaller the aging of hardness is.

[Mooney viscosity($ML_{1+4}$(125° C.)) after keeping the test rubber composition for two days in thermostatic bath at 90° C.]−[Mooney viscosity ($ML_{1+4}$(125° C.)) measured immediately after synthesis]

TABLE 1

|  | Example | | | | | Comparative Example | | |
|---|---|---|---|---|---|---|---|---|
|  | 1 | 2 | 3 | 4 | 5 | 1 | 2 | 3 |
| Compounding amount (part by mass) | | | | | | | | |
| NR | 40 | 40 | 40 | 40 | 40 | 40 | 40 | 40 |
| Un-modified BR | 25 | 25 | 25 | 25 | 25 | 25 | 25 | 25 |
| Modified BR | 35 | 35 | 35 | 35 | 35 | 35 | 35 | 35 |
| Carbon black | 5 | 5 | 5 | 5 | 5 | 5 | 5 | 5 |
| Silica | 60 | 60 | 60 | 60 | 60 | 60 | 60 | 60 |
| Silane coupling agent | 5 | 5 | 5 | 5 | 5 | 5 | 5 | 5 |
| Cyclopentadiene resin | — | — | — | — | 10 | — | — | 25 |
| Farnesene resin | 5 | 10 | 15 | 20 | 10 | — | 25 | — |
| Terpene resin | 20 | 15 | 10 | 5 | 5 | 25 | — | — |
| Oil | 15 | 15 | 15 | 15 | 15 | 15 | 15 | 15 |
| Wax | 2 | 2 | 2 | 2 | 2 | 2 | 2 | 2 |
| Antioxidant 1 | 2 | 2 | 2 | 2 | 2 | 2 | 2 | 2 |
| Antioxidant 2 | 1 | 1 | 1 | 1 | 1 | 1 | 1 | 1 |
| Processing aid | 2 | 2 | 2 | 2 | 2 | 2 | 2 | 2 |
| Stearic acid | 2 | 2 | 2 | 2 | 2 | 2 | 2 | 2 |
| Zinc oxide | 2 | 2 | 2 | 2 | 2 | 2 | 2 | 2 |
| Sulfur | 1 | 1 | 1 | 1 | 1 | 1 | 1 | 1 |
| Vulcanization accelerator 1 | 2 | 2 | 2 | 2 | 2 | 2 | 2 | 2 |
| Vulcanization accelerator 2 | 0.3 | 0.3 | 0.3 | 0.3 | 0.3 | 0.3 | 0.3 | 0.3 |
| Vulcanization accelerator 3 | 2 | 2 | 2 | 2 | 2 | 2 | 2 | 2 |
| Evaluation results | | | | | | | | |
| Braking performance on ice | 102 | 101 | 100 | 100 | 100 | 100 | 94 | 101 |
| Morphology | 104 | 104 | 101 | 100 | 102 | 100 | 95 | 102 |
| Index of silica dispersion | 101 | 100 | 100 | 100 | 101 | 100 | 95 | 100 |
| Stability over time of silica dispersion | 104 | 105 | 105 | 106 | 104 | 100 | 103 | 101 |
| Wet performance | 104 | 102 | 100 | 100 | 102 | 100 | 97 | 101 |
| Sticking of snow | 106 | 104 | 103 | 101 | 105 | 100 | 99 | 104 |
| Aging of hardness | 104 | 107 | 110 | 112 | 105 | 100 | 116 | 97 |

From the results shown in Table 1, it is seen that the studless tire having a tread composed of the rubber composition for a tread comprising predetermined amounts of the farnesene resin and the terpene resin is good in processability, braking performance on ice, morphology, silica dispersibility and stability over time of silica dispersion.

The invention claimed is:

1. A studless tire having a tread composed of a rubber composition for a tread comprising:
a rubber component which comprises 20 to 60% by mass of a natural rubber, 10 to 50% by mass of an un-modified butadiene rubber and 30 to 70% by mass of a modified butadiene rubber that has an alkoxysilane condensate compound in an active terminal thereof; and
1 to 20 parts by mass of a farnesene resin and 1 to 20 parts by mass of a terpene resin, both based on 100 parts by mass of the rubber component.

2. The studless tire of claim 1, wherein the rubber composition for a tread further comprises 5 to 100 parts by mass of silica.

3. The studless tire of claim 1, wherein the rubber composition for a tread further comprises 1 to 20 parts by mass of a cyclopentadiene resin.

4. The studless tire of claim 1, wherein a ratio of a content of a modified butadiene rubber to a content of an un-modified butadiene rubber in the butadiene rubber (content of modified butadiene rubber/content of un-modified butadiene rubber) is 0.6 to 3.0.

* * * * *